(12) United States Patent
Choi et al.

(10) Patent No.: US 7,568,809 B2
(45) Date of Patent: Aug. 4, 2009

(54) MULTIVIEW AND MULTIANGLE IMAGE RECONSTRUCTION DEVICE

(76) Inventors: Kyung Gun Choi, 108-1602, Sinan Apt. Bono2-Dong, Sangnog-Gu, Ansan-Si, Gyeonggi-Do (KR); Kyeong Ho Hahn, 1001-602, Muwonmaeul, Hangsin-Dong, Deogyang-Gu, Goyang-Si, Gyeonggi-Do (KR)

( * ) Notice: Subject to any disclaimer, the term of this patent is extended or adjusted under 35 U.S.C. 154(b) by 2 days.

(21) Appl. No.: 11/950,099

(22) Filed: Dec. 4, 2007

(65) Prior Publication Data

US 2009/0141379 A1 Jun. 4, 2009

(51) Int. Cl.
*G02B 5/08* (2006.01)
(52) U.S. Cl. ..................................... 359/865
(58) Field of Classification Search .............. 359/838, 359/850, 865
See application file for complete search history.

(56) References Cited

U.S. PATENT DOCUMENTS

| | | | |
|---|---|---|---|
| 3,432,658 A * | 3/1969 | Quinn | 378/41 |
| 3,883,683 A * | 5/1975 | Pardes | 359/216 |
| 6,466,352 B1 * | 10/2002 | Shahar et al. | 359/212 |
| 7,227,705 B2 * | 6/2007 | Krogmann et al. | 359/850 |

* cited by examiner

*Primary Examiner*—Euncha P Cherry
(74) *Attorney, Agent, or Firm*—Patent Law Group LLP; Carmen C. Cook

(57) ABSTRACT

An image reconstruction device includes a housing which is opened at an upper end thereof, a support plate which is arranged adjacent to a lower end of the housing, a plurality of partition walls which divide an area on the support plate into parts, rotation plates which are installed on the support plate to allow objects to be placed thereon, illuminators which are mounted to a side wall of the housing, reflection mirrors which are positioned above the illuminators, and a pair of concave mirrors which are arranged in an upper part of the housing. The pair of concave mirrors are provided in each of four directions, and these four pairs of concave mirrors are rotated above the housing by concave mirror rotation means.

8 Claims, 5 Drawing Sheets

MULTIVIEW AND MULTIANGLE IMAGE RECONSTRUCTION DEVICE

BACKGROUND OF THE INVENTION

1. Field of the Invention

The present invention relates to a multiview and multiangle image reconstruction device which allows a stereoscopic 3D (three-dimensional) image to be obtained.

2. Description of the Related Art

A stereoscopic image represents a virtual image which is realized in a 3D space, and can be obtained through various methods. In one method, an image is divided into left and right parts so that the left and right parts can be respectively viewed by left and right eyes. This method includes a lenticular lens system, a shutter glass system, and a parallax barrier system. Among these systems, while the lenticular lens system and the shutter glass system can project an image to a predetermined distance, they have a problem in that the distance is very short and glasses must be put on to view the image. Further, while the parallax barrier system does not employ glasses, it has a problem in that a projection distance is so short that it is difficult to project an image over a substantial distance.

Another method for obtaining a 3D image without using binocular parallax includes a volumetric 3D display system, a holographic system, and a system which employs the focal distance of a lens or a mirror. In the volumetric 3D display system, while an image can be viewed through 360°, it has a drawback in that the size of a stereoscopic image depends on the size of a rotating screen wing and the image is not clear.

Also, the holographic system reconstructs a stereoscopic image based on a hologram technology and thereby solves various problems caused in the construction of a stereoscopic image. However, since a hologram is formed by putting, on a film, wave lengths reflected from an object, the image cannot be projected outside the film.

In addition, while the system, which employs the focal distance of a lens or a mirror, has a simple theory, it is difficult to actually realize the system. This is because a substantial amount of an image is distorted or removed by the lens or the mirror. Therefore, while the system can be manufactured using a simple principle, when actually observing the image by the eyes, it is impossible to view the image at multiple viewing points, and an unclear and dim image can be provided at a specific viewing point to cause fatigue to the eyes.

FIG. 1 illustrates an example of a conventional image reconstruction device which employs a concave mirror.

The conventional image reconstruction device shown in FIG. 1 includes a support plate 30 which is installed in a housing 20, a plane mirror 40 which is attached to the side wall of the housing 20, and a pair of concave mirrors 10 which are arranged in the upper part of the housing 20. In the image construction device configured in this way, the image of an object 50, which is placed on the support plate 30, is reconstructed at a position A1.

The conventional image reconstruction device shown in FIG. 1 has an advantage in that, since the image is reflected onto the concave mirrors 10 using the plane mirror 40, the device can be miniaturized. Nevertheless, the conventional image reconstruction device has a defect in that the object 50 can be viewed from only one angle and the side face and the rear face of the object cannot be viewed.

SUMMARY OF THE INVENTION

Accordingly, the present invention has been made in an effort to solve the problems occurring in the related art, and an object of the present invention is to provide an image reconstruction device which allows a projected image to be viewed from various directions.

Another object of the present invention is to provide an image reconstruction device in which a support plate for supporting an object can be moved upward and downward so that the size of a 3D image to be reconstructed can be enlarged or reduced.

Still another object of the present invention is to provide an image reconstruction device which allows the quality and the distance of a projected image to be freely adjusted.

In order to achieve the above objects, according to one aspect of the present invention, there is provided an image reconstruction device including a housing which is opened at an upper end thereof, a support plate which is arranged adjacent to a lower end of the housing, a plurality of partition walls which divide an area on the support plate into parts, rotation plates which are installed on the support plate to allow objects to be placed thereon, illuminators which are mounted to a side wall of the housing, reflection mirrors which are positioned above the illuminators, and a pair of concave mirrors which are arranged in an upper part of the housing, wherein the pair of concave mirrors are provided in each of four directions, and these four pairs of concave mirrors are rotated above the housing by concave mirror rotation means.

According to another aspect of the present invention, the support plate is raised and lowered by raising and lowering means which is disposed on a side of the housing.

In order to achieve the above objects, according to still another aspect of the present invention, there is provided an image reconstruction device including a housing which is opened at an upper end thereof, a support plate which is arranged adjacent to a lower end of the housing, a plurality of partition walls which divide an area on the support plate into parts, rotation plates which are installed on the support plate to allow objects to be placed thereon, horizontal lenses which are mounted adjacent to the upper end of the housing, a transparent plate which is arranged above the horizontal lenses, inclined mirrors which are installed on the transparent plate, and vertical lenses which are located on an edge of the transparent plate, wherein four inclined mirrors and four vertical lenses are respectively provided in four directions and are rotated above the housing by rotation means.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
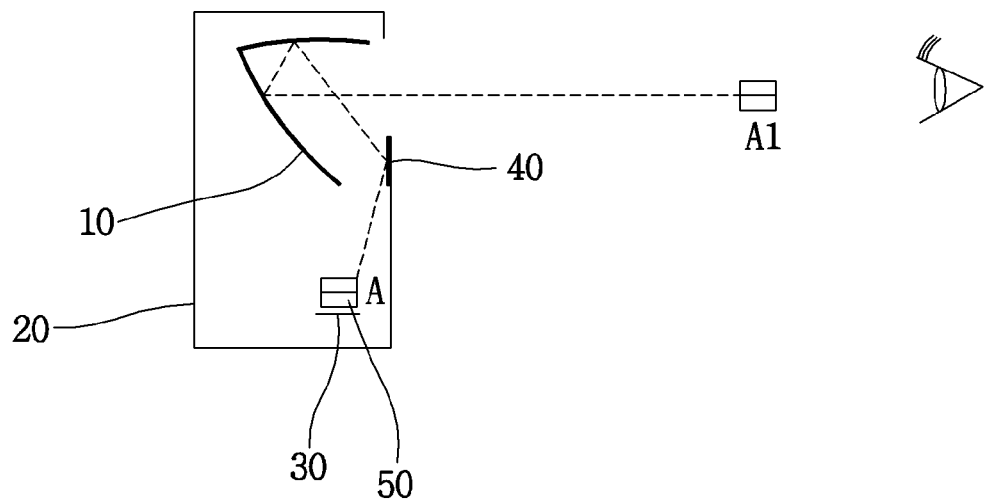
FIG. 1 is a cross-sectional view schematically illustrating a conventional image reconstruction device.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
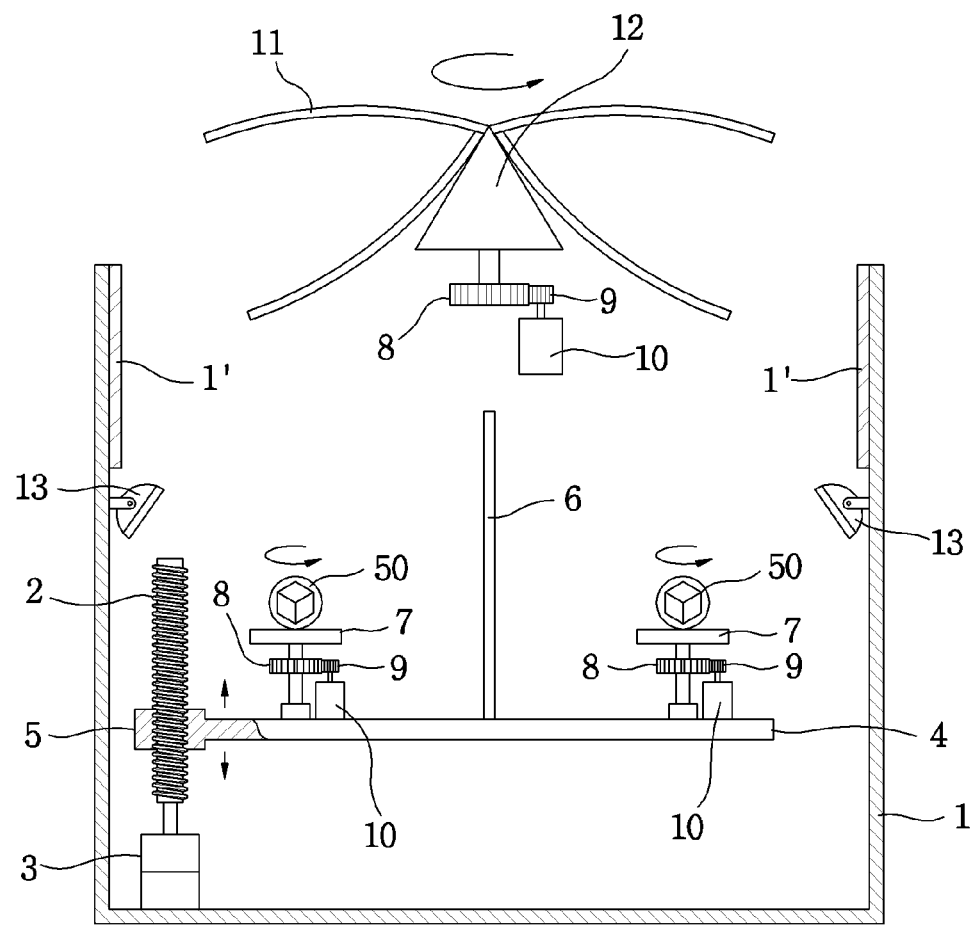
FIG. 2 is a cross-sectional view schematically illustrating an image reconstruction device in accordance with an embodiment of the present invention.
Figure 3:
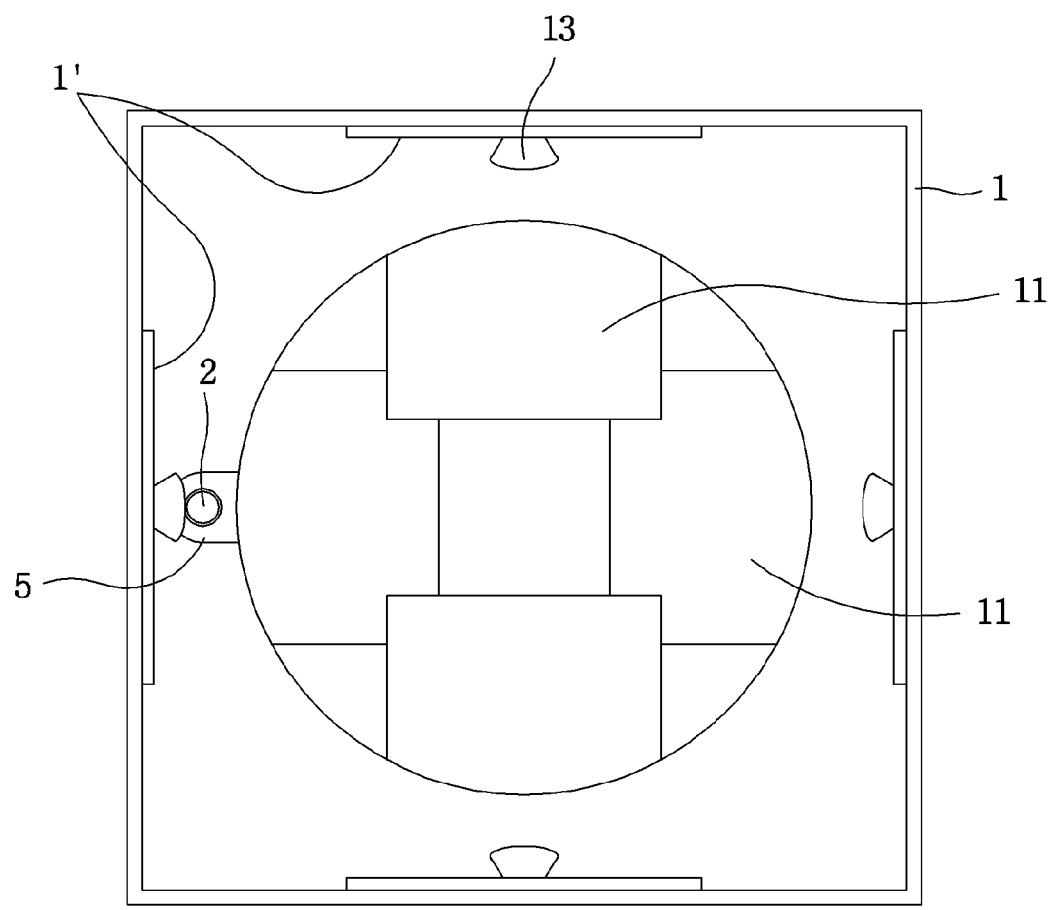
FIG. 3 is a plan view of FIG. 2.

FIGS. 2 and 3 illustrate a multiview and multiangle image reconstruction device in accordance with an embodiment of the present invention, wherein FIG. 2 is a schematic cross-sectional view and FIG. 3 is a plan view of FIG. 2.

The image reconstruction device shown in FIGS. 2 and 3 has a housing 1 which is opened at the upper end thereof. A support plate 4 is arranged adjacent to the lower end of the housing 1, and a plurality of partition walls 6 are installed on the support plate 4 to divide the area on the support plates 4 into parts. A plurality of rotation plates 7 are rotatably installed on the support plate 4.

Below each rotation plate 7, there are disposed a driven gear 8 for rotating the rotation plate 7 and a driving gear 9 meshed with the driven gear 8. The driving gear 9 is rotated by a motor 10, and the operation of the motor 10 is controlled by a controller (not shown) which is positioned outside the housing 1. Since the controller comprises a conventional one for receiving power and controlling the operation of a motor, the detailed description thereof will be omitted herein. The rotation plate 7 can be rotated on the support plate 4 through the actuation of the motor 10.

A raising and lowering screw 2 for raising and lower the support plate 4 is disposed on a side of the support plate 4. The raising and lowering screw 2 is coupled to the support plate 4 by a coupling member 5 such that the support plate 4 can be raised and lowered through the rotation of the raising and lowering screw 2. The raising and lowering screw 2 is driven by a raising and lowering driving part 3 connected to the lower end thereof.

Illuminators 13 for illuminating the objects 50 placed on the rotation plates 7 are mounted to the side walls of the housing 1, and reflection mirrors 1' are mounted to the side walls of the housing 1 above the illuminators 13.

Four pairs of concave mirrors 11 are arranged in the upper part of the housing 1. The concave mirrors 11 are supported by a concave mirror support 12. Below the concave mirror support 12, there are disposed a driven gear 8 for rotating the concave mirror support 12, a driving gear 9 meshed with the driven gear 8, and a motor 10 for rotating the driving gear 9. In the same manner as the motor 10 for driving the rotation plate 7, the operation of the motor 10 for driving the concave mirror support 12 is controlled by a controller which is positioned outside the housing 1. Therefore, if the motor 10 is actuated, as the four pairs of concave mirrors 11 are rotated, a projected image can be provided to various directions.

In the image reconstruction device configured as described above, the rotation plates 7, on which the objects 50 are placed, can be rotated, and the four pairs of concave mirrors 11, which are arranged in the upper part of the housing 1, can also be rotated.

Accordingly, differently from the conventional image reconstruction device in which a projected image can be viewed only in one angle, the projected image can be viewed from various angles. In other words, since the objects 50 can be rotated, the side faces and the rear faces of the objects 50 can be viewed.

Further, because the objects 50 can be moved upward and downward by the raising and lowering screw 2, the stereoscopic image can be freely enlarged and reduced to be viewed.

Figure 4:
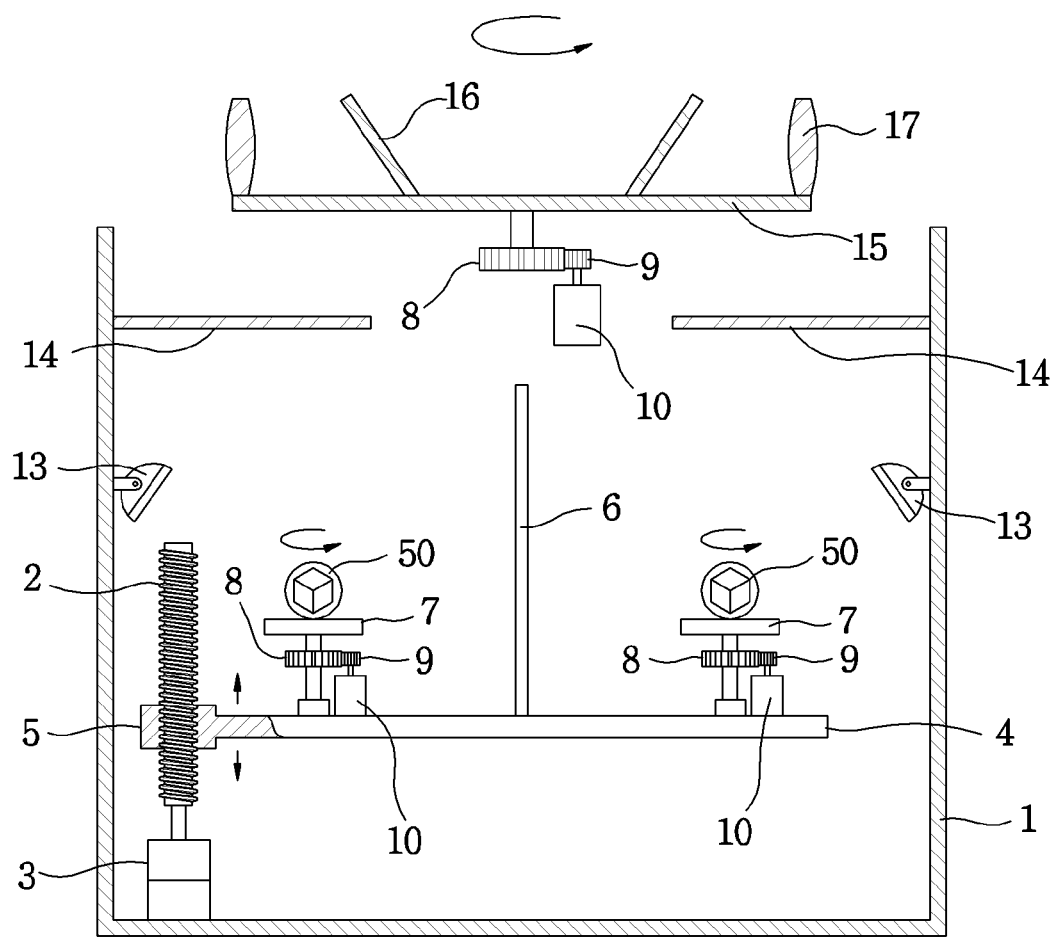
FIG. 4 is a cross-sectional view schematically illustrating an image reconstruction device in accordance with another embodiment of the present invention.
Figure 5:
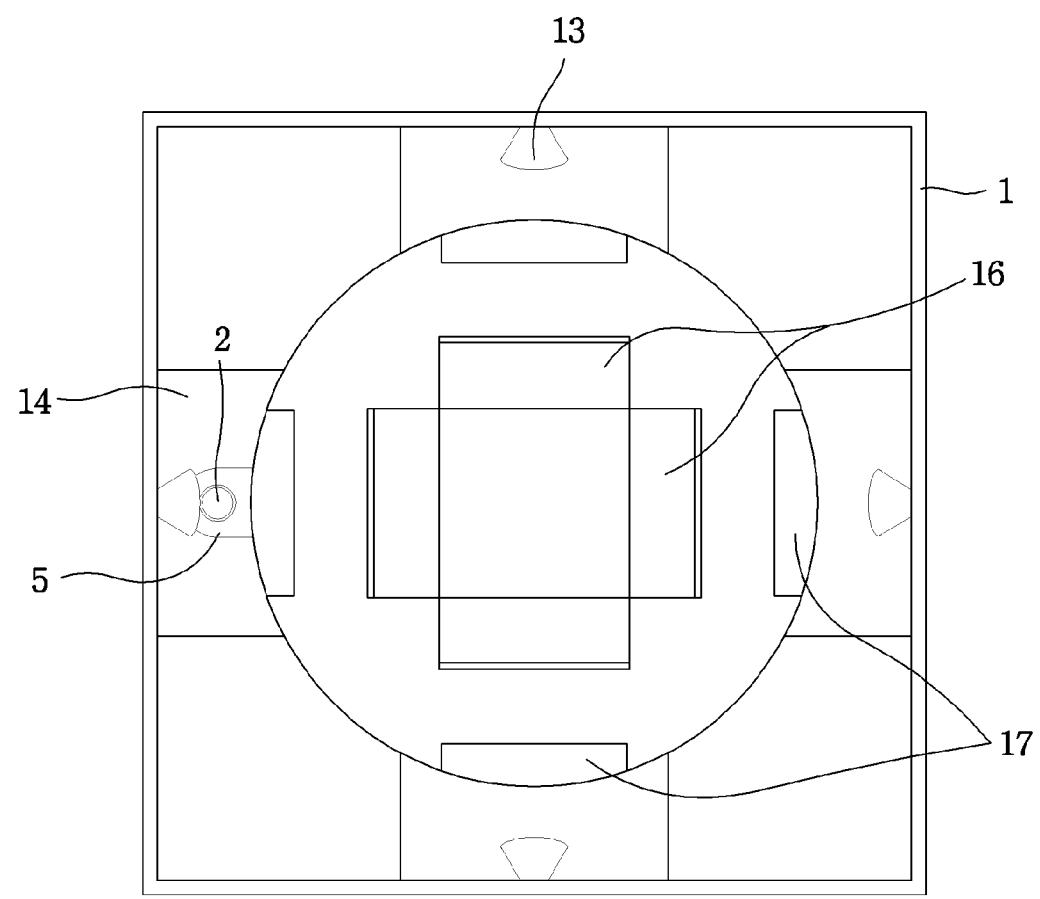
FIG. 5 is a plan view of FIG. 4.

FIGS. 4 and 5 illustrate an image reconstruction device in accordance with another embodiment of the present invention.

The image reconstruction device shown in FIGS. 4 and 5 has horizontal lenses 14 which are mounted adjacent to the upper ends of the side walls of the housing 1. Above the housing 1, there are arranged a transparent plate 15, four inclined mirrors 16 which are obliquely installed on the transparent plate 15, and four vertical lenses 17 which are located on the edge of the transparent plate 15. The vertical lenses 17 are assembled in a manner such that they can be replaced with various other lenses.

In the image reconstruction device configured in this way, a stereoscopic image, which has passed through the horizontal lenses 14, the transparent plate 15 and the inclined mirrors 16, can be viewed through the vertical lenses 17. Thus, by replacing the vertical lenses 17, the quality and the distance of the stereoscopic image can be freely adjusted.

Other component elements excluding the above-described ones are the same as those of the aforementioned embodiment, and therefore, the detailed description thereof will be omitted herein.

As is apparent from the above description, the image reconstruction device according to the present invention provides advantages in that a projected image can be stereoscopically viewed from various directions.

Also, since the side face and the rear face of an object can be viewed by directly rotating the object, in particular, the advertisement effect of an article can be maximized.

Further, because the object can be raised and lowered, the size of the projected image can be freely enlarged or reduced.

Besides, due to the fact that various lenses can be attached to the image reconstruction device, the quality and the distance of the projected image can be freely adjusted.

Although preferred embodiments of the present invention have been described for illustrative purposes, those skilled in the art will appreciate that various modifications, additions and substitutions are possible, without departing from the scope and the spirit of the invention as disclosed in the accompanying claims.

What is claimed is:

1. An image reconstruction device including a housing which is opened at an upper end thereof, a support plate which is arranged adjacent to a lower end of the housing, a plurality of partition walls which divide an area on the support plate into parts, rotation plates which are installed on the support plate to allow objects to be placed thereon, illuminators which are mounted to a side wall of the housing, reflection mirrors which are positioned above the illuminators, and a pair of concave mirrors which are arranged in an upper part of the housing, wherein the pair of concave mirrors are provided in each of four directions, and these four pairs of concave mirrors are rotated above the housing by concave mirror rotation means.

2. The image reconstruction device according to claim 1, wherein the concave mirror rotation means comprises a concave mirror support for supporting the four pairs of concave mirrors, a driven gear connected to the concave mirror support, a driving gear meshed with the driven gear, and a motor for rotating the driving gear.

3. The image reconstruction device according to claim 1 or 2, wherein the support plate is raised and lowered by raising and lowering means which is disposed on a side of the housing.

4. The image reconstruction device according to claim 3, wherein the raising and lowering means comprises a raising and lowering screw, a coupling member for coupling the raising and lowering screw to the support plate, and a raising and lowering driving part for rotating the raising and lowering screw.

5. An image reconstruction device including a housing which is opened at an upper end thereof, a support plate which is arranged adjacent to a lower end of the housing, a plurality of partition walls which divide an area on the support plate into parts, rotation plates which are installed on the support plate to allow objects to be placed thereon, horizontal lenses which are mounted adjacent to the upper end of the housing, a transparent plate which is arranged above the horizontal lenses, inclined mirrors which are installed on the transparent plate, and vertical lenses which are located on an edge of the transparent plate, wherein four inclined mirrors and four vertical lenses are respectively provided in four directions and are rotated above the housing by rotation means.

6. The image reconstruction device according to claim 5, wherein the rotation means comprises a driven gear connected to the transparent plate, a driving gear meshed with the driven gear, and a motor for rotating the driving gear.

7. The image reconstruction device according to claim 5 or 6, wherein the support plate is raised and lowered by raising and lowering means which is disposed on a side of the housing.

8. The image reconstruction device according to claim 7, wherein the raising and lowering means comprises a raising and lowering screw, a coupling member for coupling the raising and lowering screw to the support plate, and a raising and lowering driving part for rotating the raising and lowering screw.

* * * * *